United States Patent [19]

Yokokura et al.

[11] Patent Number: 4,973,153
[45] Date of Patent: Nov. 27, 1990

[54] METHOD AND APPARATUS FOR FINDING RANGE

[75] Inventors: Takashi Yokokura; Nobuo Hori; Hiroaki Shimozono; Satoru Niimura, all of Tokyo, Japan

[73] Assignee: Kabushiki Kaisha Topcon, Tokyo, Japan

[21] Appl. No.: 225,118

[22] Filed: Jul. 28, 1988

[30] Foreign Application Priority Data

Jul. 29, 1987 [JP] Japan ................................. 62-189448
Aug. 11, 1987 [JP] Japan ................................. 62-200357

[51] Int. Cl.$^5$ .............................................. G01B 9/02
[52] U.S. Cl. .................................... 356/4.5; 356/349; 356/351; 356/358
[58] Field of Search ................ 356/4.5, 349, 351, 358

[56] References Cited

U.S. PATENT DOCUMENTS 3,970,389  7/1976  Mendrin et al. ..................... 356/4.5

FOREIGN PATENT DOCUMENTS 130803  3/1978  German Democratic Rep. ..................................... 356/4.5

Primary Examiner—Davis L. Willis
Assistant Examiner—Matthew W. Koren
Attorney, Agent, or Firm—Finnegan, Henderson, Farabow, Garrett & Dunner

[57] ABSTRACT

A range finder for finding a distance to an object comprising an outgoing light guiding wave path, a reference light guiding wave path, and an incoming light guiding wave path. The finder further comprises wavelength changing means for changing the wavelength of the beam of light emitted from the light source, wavelength detecting means for detecting the wavelength of the beam of light emitted from the light source, and calculating means for detecting at least two peaks of the signal coming from the light receiving element when the wavelength of the light source is changed by the wavelength changing means, finding the wavelengths of the light source, respectively, from the wavelength detecting means at the time when the signal exhibits the two peaks, and calculating the distance to the object according to an operation expression memorized beforehand with reference to such obtained two wavelengths. A total reflection prism, a polarized beam splitter, a quarter-wave plate, and a mode converting device are also provided.

7 Claims, 7 Drawing Sheets

FIG.3

| ℓ | 150μm | 10cm | 100cm |
|---|---|---|---|
| $N$ ($\lambda_0 = 830$nm) | 361 | 240964 | 2409380 |
| $\lambda_1 - \lambda_0 = \delta\lambda$ | 2.3 nm | 0.0034 nm | 0.00034 nm |
| $N'$ ($\lambda = 833$nm) | 360 | 240097 | 2400960 |
| $N - N' = \Delta N$ | 1 | 867 | 8678 |

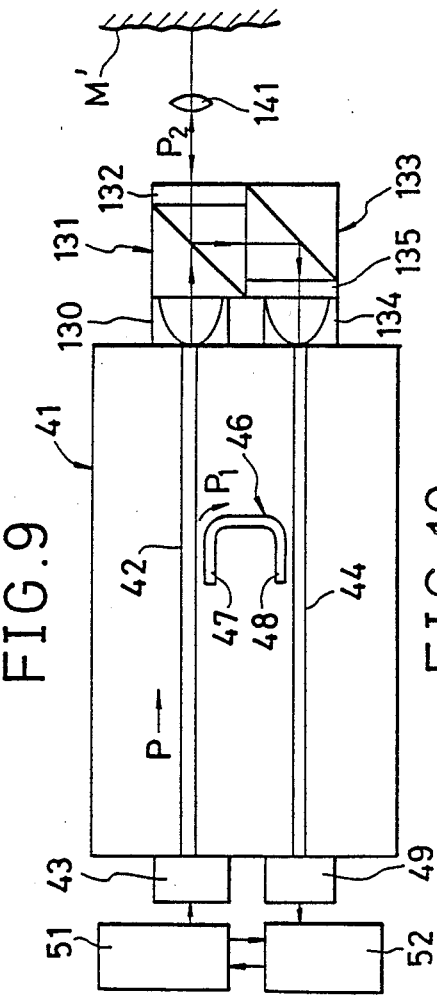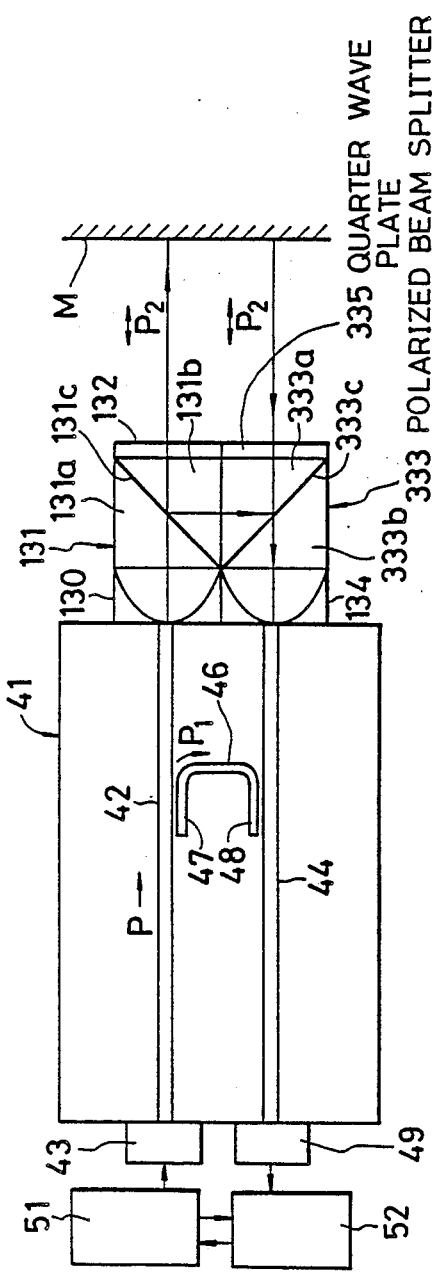

METHOD AND APPARATUS FOR FINDING RANGE

BACKGROUND OF THE INVENTION

1. Field of the Invention

This invention relates to a method and an apparatus for finding a distance to an object, and more particularly to a range finding method and a range finder for carrying out the method, in which a distance to an object is found in such a manner as that a reference beam of light and a reflected beam of light reflected on the object are interfered with each other, and the interference light is guided to a light receiving element.

2. Description of the Prior Art

Heretofore, there has been known a distance measuring device or range finder (Japanese Utility Model Publication No. Sho 56-15522) of the recursive optical system type as shown in FIGS. 11 and 12. In FIG. 11, 1 denotes a thin film substrate which is formed with a two-dimensional type guiding wave path. The thin film substrate 1 comprises triple-layer of thin films 4, 2 and 3. The thin film 2 has a light transmitting property. The refractive index of the thin film 2 is larger than those of the thin films 4 and 3 which are disposed at both sides thereof. A coherent light P emitted by a light source 5 is made incident to the thin film substrate 1. The coherent light P is reflected by both boundary surfaces of the thin film 2 and the thin films 3,4 and propagated through the thin film 2. The thin film substrate 1 is provided at its incident side with a collimator lens system 6. The coherent light P made incident to the thin film 2 is made into a parallel pencil of rays by the collimator lens system 6. The parallel pencil of rays is split into a reference light $P_1$ and a measuring light $P_2$ by a half mirror 7.

The reference light $P_1$ is reflected by a reference mirror 10 formed on a thin film substrate 1 and returned to the half mirror system 7 again. The measuring light $P_2$ is reflected by a measuring mirror 9 as an object and returned to the half mirror system 7. The returned measuring and reference light $P_1$ and $P_2$ are composed by the half mirror system 7 and guided to a measuring lens 11 as an interference light. The interference light is emitted out of the film through an outgoing prism 8. The interference light emitted from the prism 8 is dark when the difference in optical distance of the reference light $P_1$ multiplies oddly as against $\lambda/2$ ($\lambda$ is a wavelength of the coherent light P) with respect to that of the measuring light $P_2$. On the other hand, the interference light is bright when the difference multiplies integrally as against $\lambda/2$. Therefore, if the measuring mirror 9 is moved in the direction as shown by an arrow G, an interference signal based on the interference light, as shown in FIG. 13, has a bright portion A and a dark portion B alternately every time the amount moved of the measuring mirror 9 is increased by $\lambda 2$. Accordingly, by counting the number of the bright and dark portions A and B, the amount moved of the measuring mirror 9 can be found. Similarly, by counting the amount moved of the measuring mirror 9 from the origin, the length of the object can be measured.

In the conventional range finder, since the distance moved is measured by moving the mirror 9, there is a risk that an optical path R is cut during the movement of the mirror 9. As a result, the measurement of the distance becomes unable to be carried out.

Furthermore, in this kind of a light integration type range finder, a part of the measuring light $P_2$ reflected by the mirror 9 is reflected by the half mirror system 7 and returned to the light source 5. Likewise, a part of the reference light $P_1$ reflected by the reference mirror 10 is also passed through the half mirror 7 and returned to the light source 5. Due to the affection of this return light, the output of the light source 5 is fluctuated and an accurate measurement is disturbed.

SUMMARY OF THE INVENTION

It is therefore a first object of the present invention to provide a range finding method and a range finder which is capable of measuring a distance to an object without moving a mirror as the object.

In order to achieve the first object, a range finding method according to the present invention comprises the steps of radiating a beam of light from a light source toward an object, guiding a part of the beam of light to a reference optical path, allowing the reference beam of light guided to the reference optical path and the reflecting beam of light reflected by the object to be interfered with each other, and guiding the interference light to a light receiving element, said method further comprises the steps of changing the beam of light emitted from the light source in wavelength using wavelength changing means so that at least two peaks of a signal coming from the light receiving element will appear, and obtaining a wavelength corresponding to each peak of the signal.

Likewise, in order to achieve the first object of the present invention, in a range finder according to the present invention in which a distance to an object is measured by radiating a beam of light from a light source toward the object, guiding a part of the beam of light to a reference optical path, causing the reference beam of light guided to the reference optical path and the reflecting beam of light reflected by the object to be interfered with each other, and guiding the interference light to a light receiving element, said finder comprises wavelength changing means for changing the wavelength of the beam of light emitted from the light source;

wavelength detecting means for detecting the wavelength of the beam of light emitted from the light source; and calculating means for detecting at least two peaks of the signal coming from the light receiving element when the wavelength of the light source is changed by said wavelength changing means, finding the wavelengths of the light source, respectively, from said wavelength detecting means at the time when the signal exhibits the two peaks, and calculating the distance to the object according to an operation expression memorized beforehand with reference to such obtained two wavelengths.

A second object of the present invention is to provide a range finder, in which a beam of light reflected by an object is not returned to a light source.

In order to achieve the second object, in a range finder comprising an outgoing light guiding wave path for guiding a beam of light emitted from a light source to the object, a reference light guiding wave path for guiding a part of a beam of light propagating through the light guiding wave path to outside the outgoing light guiding wave path, and an incoming light guiding wave path adapted to allow the reflecting beam of light reflected by the object, and a beam of light guided by the reference light guiding wave path to be interfered with each other and to guide the interference light to a light receiving element, said finder further comprises wavelength changing means for changing the wavelength of the beam of light emitted from the light source;

wavelength detecting means for detecting the wavelength of the beam of light emitted from the light source;

calculating means for detecting at least two peaks of the signal coming from the light receiving element when the wavelength of the light source is changed by said wavelength changing means, finding the wavelengths of the light source, respectively, from said wavelength detecting means at the time when the signal exhibits the two peaks, and calculating the distance to the object according to an operation expression memorized beforehand with reference to such obtained two wavelengths;

a polarizing beam splitter disposed on an optical path of the beam of light radiated from the outgoing light guiding wave path;

a quarter-wave plate disposed on an optical path between said polarizing beam splitter and the object; and a mode converting device for converting the mode of the reflecting beam of light guided to the incident light guiding wave path to the same mode of the beam of light propagating through the outgoing light guiding wave path;

said polarizing beam splitter projecting the beam of light coming from the outgoing light guiding wave path to the object through the quarter-wave plate and guiding the beam of light reflected by the object and made incident thereto through the quarter-wave plate to the incident light guiding wave path.

BRIEF DESCRIPTION OF THE DRAWINGS

FIGS. 1 through 4 are illustrations of one embodiment for achieving the first object of the present invention, wherein;

FIG. 1 is a schematic view of a range finder designed for carrying out the method of the present invention;

FIG. 2 is an illustration of the relation between the wavelength of a beam of light output from a light source and an output signal of a light receiving element;

FIG. 3 is a table showing one example of values such as the scanning wavelength and the measuring distance of a corner cube prism;

FIG. 4 is a schematic view of an important portion of the second embodiment for achieving the first object of the present invention;

FIG. 9 is an illustration showing an important portion of the fourth embodiment for achieving the second object of the present invention;

FIG. 10 is an illustration showing an important portion of the fifth embodiment for achieving the second object of the present invention;

DETAILED DESCRIPTION OF THE EMBODIMENT

Embodiments for achieving the first and the second objects of the present invention will be described hereunder with reference to the accompanying drawings.

EMBODIMENT FOR ACHIEVING THE FIRST OBJECT (First Embodiment)

Figure 1:
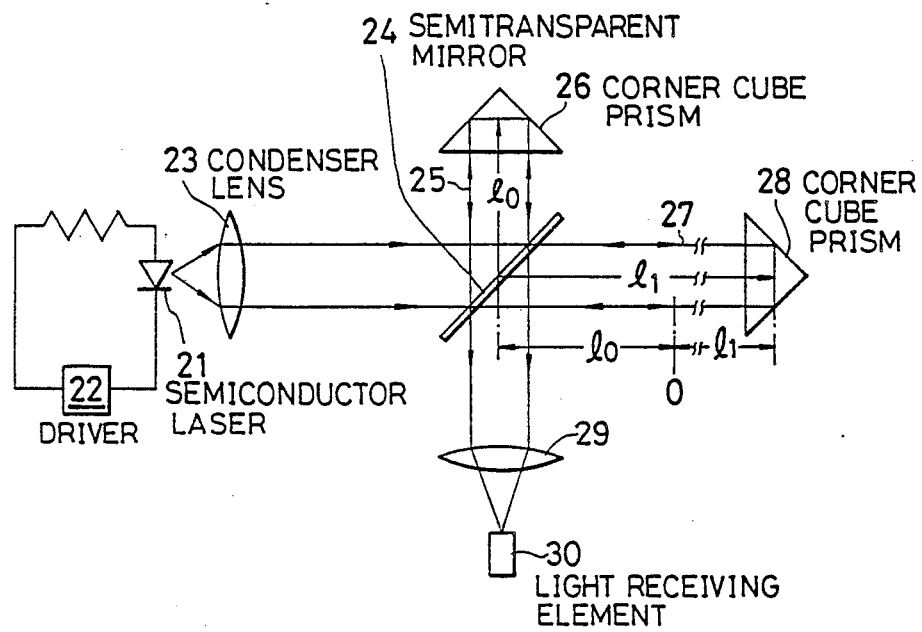
Figure 2:
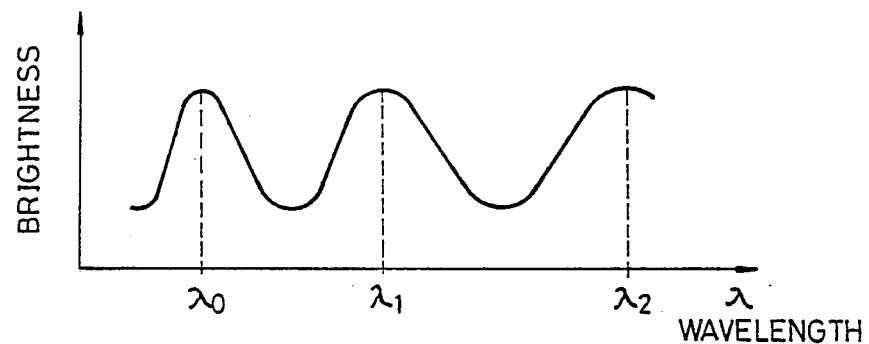

FIG. 1 is a schematic view of a range finder for carrying out the method of the present invention. In FIG. 1, 21 denotes a semiconductor laser which is designed such that the wavelength of the emitted laser beam is changed depending on a driving electric current fed by a driver 22 (generally, a semiconductor laser has a characteristics that the wavelength of an emitted laser beam becomes longer as a feeding electric current is increased). 23 denotes a condenser lens for making a laser beam emitted by this semiconductor laser 21 into a parallel pencil of rays, and 24 denotes a semi-transparent mirror for bisecting the laser beam after the beam is made into a parallel pencil of rays. The semi-transparent mirror 24 is adapted to guide the bisected one laser beam to a corner cube prism 26 disposed at a reference optical path 25 and the bisected other laser beam to a corner cube prism (object) 28 disposed at a measuring optical path 27. 29 denotes a condenser lens and 30 denotes a light receiving element.

When a laser beam is emitted by the semiconductor laser 21, the laser beam arrives at the semi-transparent mirror 24 through the condenser lens 23 and is bisected therein. The bisected one laser beam is guided to the corner cube prism 26 located at the reference optical path 25 and then reflected by the corner cube prism 26 to return to the semi-transparent mirror 24. On the other hand the bisected other laser beam is guided to the corner cube prism 28 located at the measuring optical path 27 and then reflected by the corner cube prism 28 to return to the semi-transparent mirror 24. Both the bisected laser beams returned to the semi-transparent mirror 24 interfered with each other and condensed to the light receiving element 30 by the condenser lens 29.

Then, if the driving electric current to be fed to the semiconductor laser 21 is increased by the driver 22 so as to change the wavelength of the laser beam, the brightness/darkness (it becomes bright when the optical path difference of the reference optical path length and the measuring optical path length multiplies integrally as against $\lambda/2$, and it becomes dark when the difference multiplies oddly as against $\lambda/2$) due to the interference of the laser beam bisected by the semi-transparent mirror 24 is incident on the light receiving surface of the light receiving element 30. A, signal corresponding to the brightness or the darkness is output from the light receiving element 30.

If the reference optical path length is represented by $2l_0$, the measuring optical path length by $2l_1$, the wavelength of the laser beam at the time when the first peak of a signal output by the light receiving element 30 appears by $\lambda_0$, the wavelength of the laser beam at the time when next peak appears by $\lambda_1$, and the double optical path length from the origin O to the corner cube prism 28 by $2l$, the following relations can be obtained;

$$2l2l_1 - 2l_0 = N\lambda_0 \therefore l = l_1' - l_0 = N\lambda_0/2 \quad (1)$$

$$l = l_1 - l_0 = (N-1)\lambda_1/2 \quad (2)$$

wherein N is an integral number. From the relations (1) and (2)

$$l = \lambda_0\lambda_1/2(\lambda_1 - \lambda_0)$$

and $l$ can be found from $\lambda_0$, $\lambda_1$. That is, the distance from the origin O to the corner cube prism 28 can be found by scanning the wavelength of the laser beam emitted by the semiconductor laser 21 without moving the corner cube prism 28 and obtaining two wavelengths where the signal output from the light receiving element 30 becomes peaks.

If the above-mentioned relations (1) and (2) are solved with respect to N, $$N = \lambda_1/(\lambda_1 - \lambda_0)$$

Therefore, an integral number N closest to $\lambda_1/(\lambda_1 - \lambda_0)$ may be found so that $l$ can be found from N and $l = N\lambda_0/2$ of the relation (1).

The table of FIG. 3 shows one example of the values of $\lambda_1 - \lambda_0 = \delta$ and N at the time when the wavelength of the laser beam is scanned from 830 nm to 833 nm and in case the measuring distances are 150μ, 10 cm and 100 cm.

(Second Embodiment)

Figure 4:
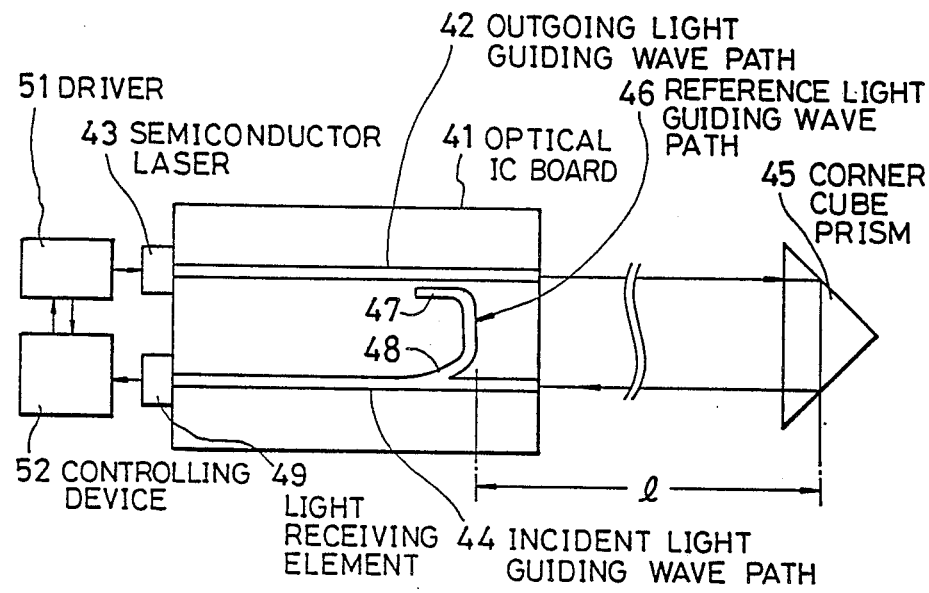

FIG. 4 schematically illustrates the second embodiment of the range finder. In the figure, 41 denotes an optical IC board comprising, for example, of a lithium-niobate. The optical IC board 41 is formed thereon with an outgoing light guiding wave path 42. 43 denotes a semiconductor laser disposed at an end face of the board 41. A laser beam emitted from the semiconductor laser 43 is guided into the outgoing light guiding wave path 42. 44 denotes an incident light guiding wave path for guiding a reflecting beam, reflected by a corner cube prism (object) 45, and 46 denotes a reference light guiding wave path comprising a directional coupler 47 coupled to the outgoing light guiding wave path 42, a converging portion 48 coupled to the incident light guiding wave path 44, etc. The reference light guiding wave path 46 is adapted to transfer a part of the laser beam propagating through the outgoing light guiding wave path 42 and to permit the transferred beam to be interfered with the reflecting beam guided into the incident light guiding wave path 44. The interfered interference light is guided to a light receiving element 49 by the incident light guiding wave path 44.

51 denotes a driver for feeding a driving electric current to the semiconductor laser 43, 52 denotes a controlling device comprising a microcomputer, etc. The controlling device 52 functions to control the driver 51 to change the driving electric current which is to be fed to the semiconductor laser 43 so that the wavelength of the laser beam emitted from the semiconductor laser 43 is scanned (changed), to detect the wavelength of the laser beam emitted from the semiconductor laser 43 based on the driving electric current which is to be fed to the semiconductor laser 43, and to detect the peak of an signal output from the light receiving element 49 in order to find the wavelength of the laser beam at the time when the signal exhibits the peak.

The controlling device detects two peaks from a signal output from the light receiving element 49, finds the wavelength of the laser beam at the time when the wavelength exhibits the peak, and calculates the distance to the corner cube prism 45 from the obtained two wavelengths based on the following operation expression (see the first embodiment) discussed beforehand;

$$l = \lambda_0\lambda_1/2(\lambda_1 - \lambda_0)$$

Figure 5:
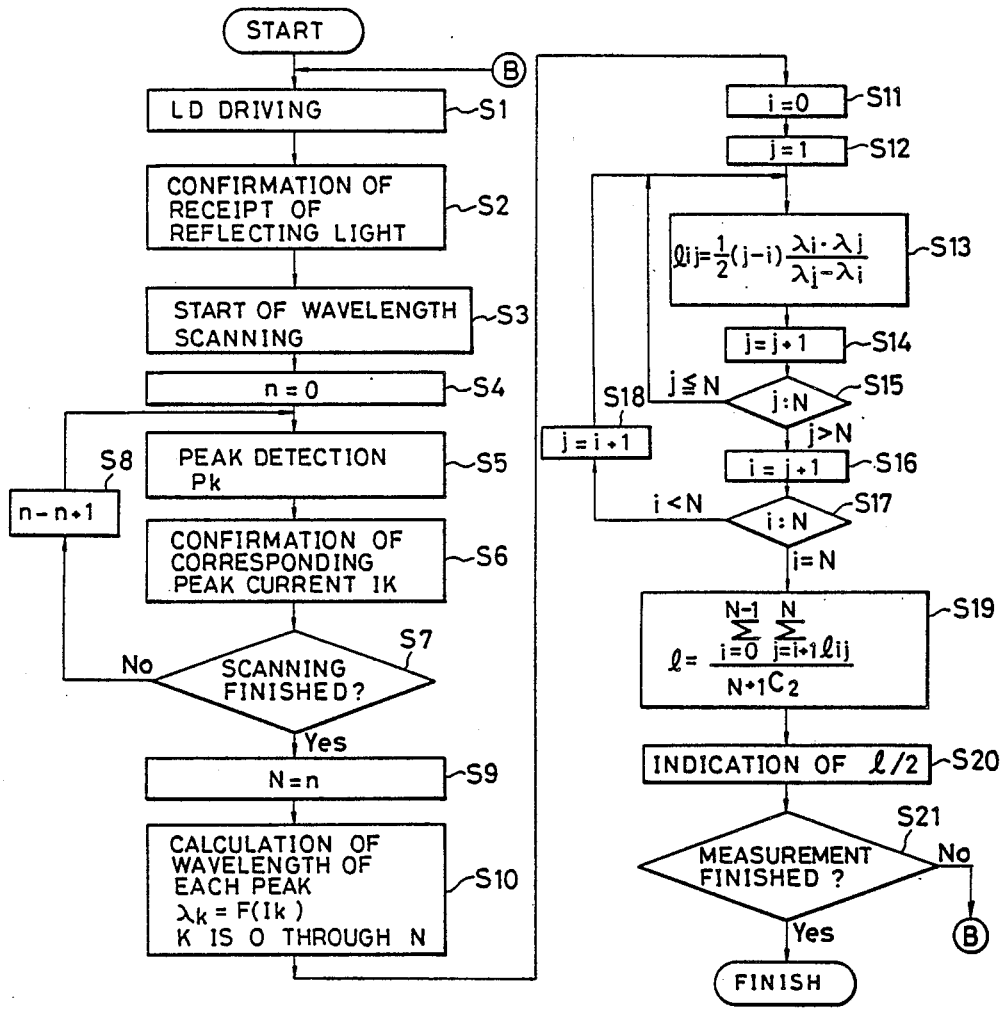
FIG. 5 is a flow chart for to a controlling device of the range finder shown in the second embodiment.

Next, operation of the above-mentioned range finder will be briefly described with reference to the flow chart shown in FIG. 5.

In step 1, the driver is activated in order that a laser beam is emitted from the semiconductor laser 43, then a laser beam is guided to the outgoing light guiding wave path 42. The guided laser beam is propagated through the outgoing light guiding wave path 42 and radiated toward the corner cube prism 45. The radiated laser beam is reflected by the corner cube prism 45 and guided to the incident light guiding wave path 44. The guided reflecting light is interfered with a part of the laser beam which has been transferred to the incident light guiding wave path 44 by the reference light guiding wave path 46 and propagated through the outgoing light guiding wave path 42 and guided to the light receiving element 49. In step 2, it is confirmed whether or not the light receiving element 49 has received the interference light, in other words, whether or not the alignment has been verified. And, in step 3, the driving electric current which is to be fed to the semiconductor laser 43 is increased and the wavelength of the laser beam is scanned. In step 4, n, equivalent to the peak NO, is initialized to 0. In step 5, the peak of a signal output by the light receiving element 49 is output and in step 6, driving electric current of the semiconductor laser 49 corresponding to each peak is memorized. In step 7, it is judged whether or not the scanning of the wavelength is over and the routine of the peak detection is repeated until the scanning is over. And, in step 10, the wavelength at each peak is calculated by the calculating means, and in steps 13 through 18, $l_{ij}$ is calculated from the wavelength of each peak. In step 19, $l$ is calculated by averaging $l_{ij}$. In step 20, the calculated $l$ is displayed and the measurement of the distance $l$ of the corner cube prism 45 is complete.

The distance $l/2$ may be found using $N = (i\lambda_i - j\lambda_j)/(\lambda_i - \lambda_j)$ instead of the operation expression shown in step 13. In that case, an integral number $N_0$ closest to N is found from this relation and $l_i$ is calculated from $$l_i = (N_0 - i)\lambda_i/2 (i = 0,1,2 \ldots)$$

and this $l_i$ is averaged in step 19 to find $l$.

As described above, according to the present invention, since the distance to the object can be measured simply by scanning the wavelength without moving the object, it never occurs, contrary to the prior art, that the optical path is cut during the movement of the object and that, as the result, the measurement becomes difficult to carry out.

EMBODIMENT FOR ACHIEVING THE SECOND OBJECT

(First Embodiment)

Figure 6:
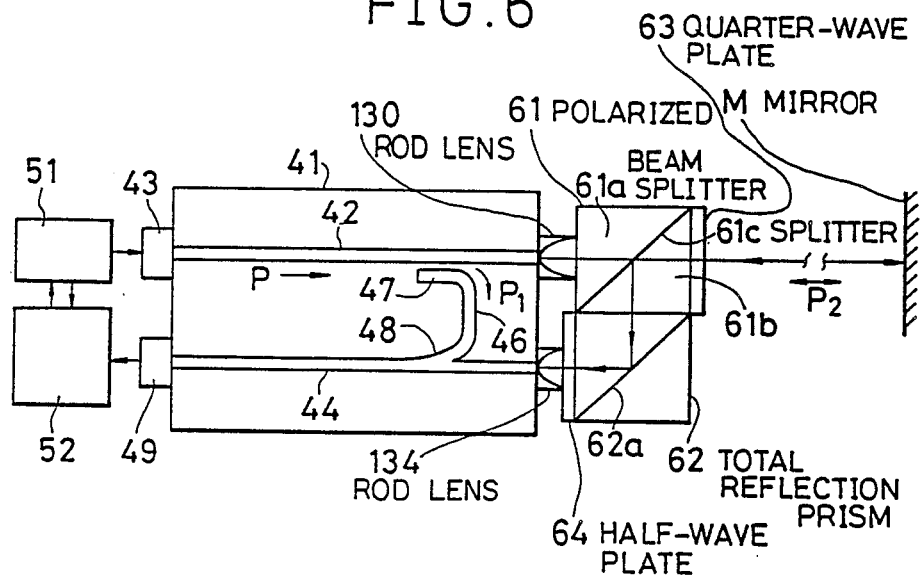
FIG. 6 is an illustration showing an important portion of the first embodiment for achieving the second object of the present invention.

FIG. 6 illustrates an embodiment for achieving the second object of the present invention. In the figure, 61 denotes a polarized beam splitter, 62 denotes a total reflection prism, 63 denotes a quarter-wave plate for making a linearly polarized beam into a circularly polarized beam, and 64 denotes a half-wave plate. The rod lenses 130 and 143 are of the refractive index distribution type.

The polarized beam splitter 61 comprises two prisms 61a and 61b, and 61c denotes a reflecting surface thereon. The coherent light P emitted from the laser beam source 43 is linearly polarized. This coherent light P is made incident to the outgoing light guiding wave path 42 in its TE mode. The coherent light P made incident to the outgoing light guiding wave path 42 is emitted as a parallel pencil of rays by a rod lens 130 and made incident to the polarized beam splitter 61. The coherent light P is permitted to transmit through the reflecting surface 61c when it is polarized in P-polarization mode. On the other hand, the coherent light p is reflected by the reflecting surface 61c when it is polarized in S-polarization mode.

The linearly polarized coherent light P made incident to the polarized beam splitter 61 is transmitted through the reflecting surface 61c, arrived at the plane mirror M as a measuring light $P_2$ and reflected by the plane mirror M. By the way, the linearly polarized measuring light $P_2$ now becomes a circularly polarized light since it has already passed the quarter-wave plate 63. The circularly polarized measuring light $P_2$ is made incident to the quarter-wave plate 63 again. This measuring light $P_2$ becomes a linearly polarized light when it passes the quarter-wave plate 63. Since the polarizing direction of the measuring light $P_2$ is turned by 90°, the measuring light $P_2$ reflected by the plane M and returned is polarized in S-mode when it passes the quarter-wave plate 63. The measuring light $P_2$ in this S-polarization mode is reflected by the slant surface 61a of the polarized beam splitter 61, made incident to the total reflection prism 62, then reflected by the reflecting surface 62a of the total reflecting prism 62 and then passed through the half-wave plate 64. At this time, the measuring $P_2$ in S-polarization mode is polarized in P-mode by the half-wave plate 64, condensed by a rod lens 134 and guided to the incident light guiding wave path 44. This half-wave plate 64 has the function as mode setting means for turning the polarizing direction by 90°. Then, the measuring light $P_2$ guided to the incident light guiding wave path 44 and the reference light $P_1$ transferred to the incident light guiding wave path 44 by the reference light guiding wave path 46 are interfered with each other and guided to light receiving element 49. The remaining operation is the same as the second embodiment.

In this way, since the beam of light reflected by the plane mirror M is totally reflected by the slant surfaces 61c and 62a of the polarized beam splitter 61 and the total reflection prism 62, the total amount of the reflected beam is guided to the incident light guiding wave path 44. Accordingly, since a part of the reflected beam is never returned to the laser beam source 23, the wavelength output of the beam source 43 does not fluctuate. Accordingly, a length measurement can be correctly carried out consistently.

(SECOND EMBODIMENT)

Figure 7:
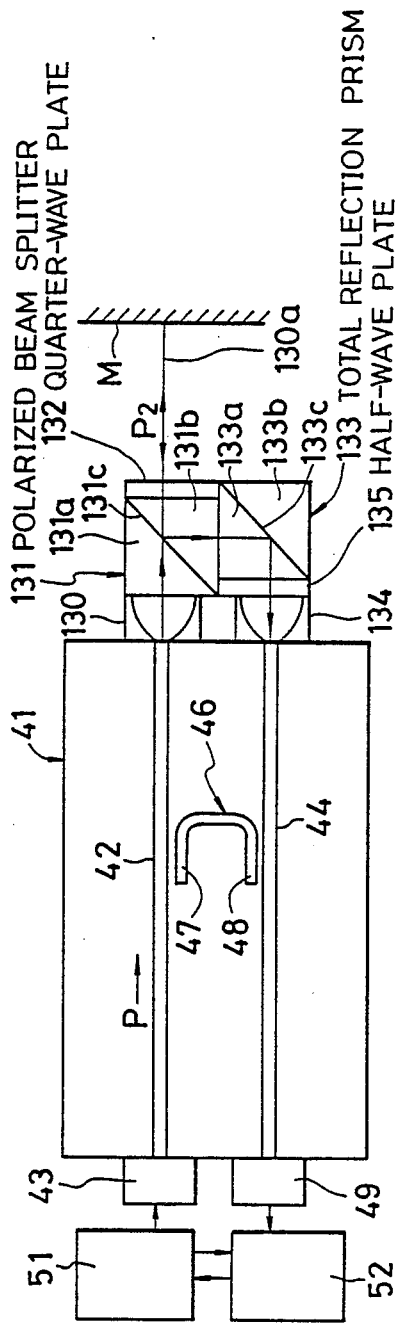
FIG. 7 is an illustration showing an important portion of the second embodiment for achieving the second object of the present invention.

FIG. 7 illustrates the second embodiment for achieving the second object of the present invention. In this embodiment, the coherent light P emitted from the laser beam source 43 is linearly polarized. The coherent light P is made incident to the outgoing light guiding wave path 42 in its TE mode. The rod lens 130 is the refractive index distribution type. The rod lens 130 is provided with a polarized beam splitter 131 which constitutes measuring light polarizing means in cooperation with a quarter-wave plate and a total reflection prism as will be described. This polarized beam splitter 131 comprises two prisms 131a and 131b, and 131c denotes a reflecting surface thereon.

The coherent light P is emitted as a parallel pencil of rays from a rod lens 130. The coherent light P is permitted transmitted through the reflecting surface 131c when it is polarized in P-polarization mode. On the other hand, the coherent light p is reflected by the reflecting surface 131c when it is polarized in S-polarization mode.

The polarized beam splitter 131 is provided on its one surface with a quarter-wave plate 132 adapted to change the linearly polarized coherent light P into a circularly polarized coherent light P. The coherent light P emitted from the rod lens 130 is converted from the linearly polarized light to a circularly polarized light by the quarter-wave plate 132. This circularly polarized coherent light P is guided to the plane mirror M and reflected by the plane mirror M. The circularly polarized measuring light $P_2$ reflected by the plane mirror M is made incident to the quarter-wave plate 132 again. This measuring light $P_2$ becomes a linearly polarized light when it passes the quarter-wave plate 132. Since the polarizing direction of the measuring light $P_2$ is turned by 90° here, the measuring light $P_2$, reflected by the plane M and returned, is polarized in S-mode when it passes the quarter-wave plate 132.

Accordingly, the measuring light $P_2$ in its S-polarization mode is reflected by reflecting surface 131c. A total reflection mirror 133 is disposed in front of the reflecting direction of the measuring light $P_2$ in its S-polarization mode. The total reflection prism 133 comprises two prisms 133a and 133b, and 133c denotes a reflecting surface thereon. Between the total reflection prism 133 and a rod lens 134, a half-wave plate 135 is disposed. This half-wave plate 135 has the function as mode setting means for turning the polarizing direction by 90°. The measuring light $P_2$ in its S-polarization mode made incident to the total reflection prism 133 is reflected by the reflecting surface 133c and made incident to the half-wave plate 135.

The S-polarization mode measuring light $P_2$ becomes a P-polarization mode measuring light $P_2$ by the half-wave plate 135 and is made incident to the incident light guiding wave path 44. This P-polarization mode measuring light $P_2$ interferes with the reference light $P_1$ made incident to the incident light guiding wave path 44 via the reference light guiding wave path 46. The interference light of the measuring light $P_2$ and the reference light $P_1$ is guided to the light receiving element 49 and converted into an interference signal. The reference light guiding wave path 46 is connected to the outgoing light guiding wave path 42 and the incident light guiding wave path 44 by the directional couplers 47 and 48, respectively. In this way, since the measuring light $P_2$ reflected by the plane mirror M is reflected in the direction where the total reflection prism 133 is present by the polarized beam splitter 131, a part of the measuring light $P_2$ is prevented from returning to the laser beam source 43. As a result, the wavelength output of the beam source becomes stable and an accurate measurement can be carried out.

Figure 8:
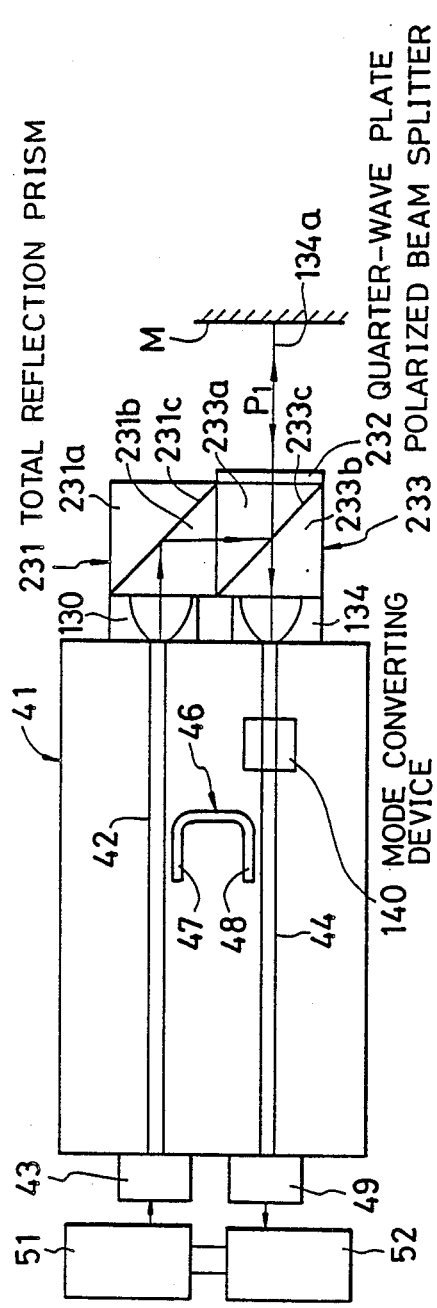
FIG. 8 is an illustration showing an important portion of the third embodiment for achieving the second object of the present invention.
Figure 11:
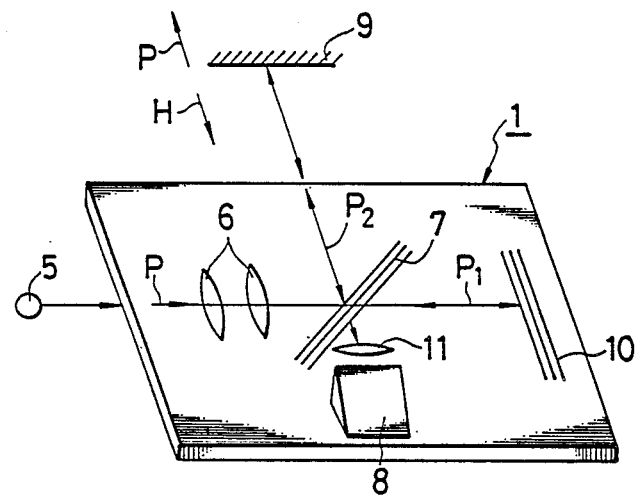
FIG. 11 is a view showing a conventional light integration type range finder.
Figure 12:
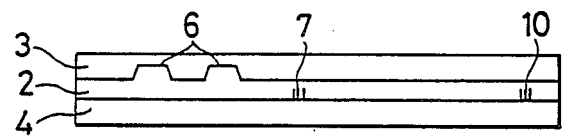
FIG. 12 is a side view of the light integration type range finder shown in FIG. 11.
Figure 13:
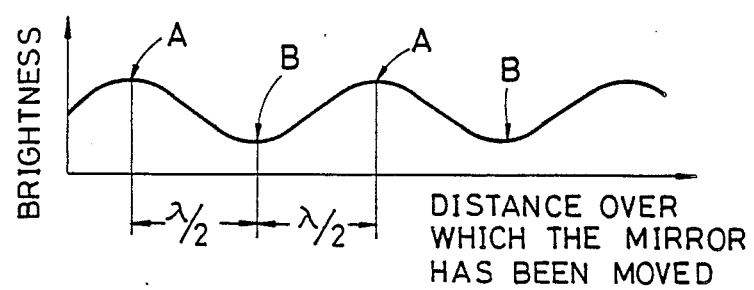
FIG. 13 is an illustration showing the change of intensity of an interference light obtained by the light integration type range finder.

FIG. 8 illustrates the third embodiment for achieving the second object. In this third embodiment, the rod lens 130 is attached with a total reflection prism 231, whereas the rod lens 134 is attached with a polarized beam splitter 233. In this embodiment, the laser beam source 43 emits a S-polarization mode coherent light P. The S-polarization mode coherent light P is reflected by the reflecting surfaces 231c and 233c of the total reflection prism 231 and the polarized beam splitter 233. A quarter-wave plate 232 is disposed on one surface of the polarized beam splitter 233 in the same manner as the first embodiment. After passing through the quarter-wave plate 232, the measuring light $P_2$ becomes a circularly polarized light and is guided to the plane mirror M. Then, this circularly polarized measuring light $P_2$ is reflected by the plane mirror M and made incident to the quarter-wave plate 232 again. The circularly polarized measuring light $P_2$ passes through the quarter-wave plate 232 and becomes a P-polarization mode measuring light $P_2$ and then is made incident to the polarized beam splitter 233.

The P-polarization mode measuring light $P_2$ is transmitted through the reflecting surface 233a and made incident to the incident light guiding wave path 44. The incident light guiding wave path 44 is provided with a mode converting device 140 as mode setting means between the rod lens 134 and the directional coupler 48. The mode converting device 140 functions to rotate a polarized wave surface of the measuring light $P_2$ propagating through the incident light guiding wave path 44 due to magneto-optical effect obtained by applying a magnetic field to the incident light guiding wave path 44, for example. By this, the measuring light $P_2$, made incident to the incident light guiding wave path 44 in its P-polarization mode, becomes a S-polarization mode measuring light $P_2$. Accordingly, the S-polarization mode measuring light $P_2$ made incident to the incident light guiding wave path 44 and the S-polarization mode reference light $P_1$ guided to the incident light guiding wave path 44 via the reference light guiding wave path 46 are interfered with each other and become an interference light.

FIG. 9 illustrates the fourth embodiment for achieving the second object of the present invention. This fourth embodiment is a modified embodiment of the first embodiment. In this fourth embodiment, a rough surface M' is employed instead of the plane mirror M for reflecting the measuring light $P_2$. The rough surface M' is disposed at the focal point of a convex lens.

FIG. 10 illustrates the fifth embodiment for achieving the second object of the present invention. In this embodiment, the measuring light $P_2$ is reflected by the plane mirror M twice.

In this embodiment, the measuring light $P_2$ emitted from the rod lens 130 is a P-polarization mode. Accordingly, the measuring light $P_2$ passes the polarized beam splitter 131. Then, it becomes a circularly polarized light $P_2$ by the quarter-wave plate 132, guided to the plane mirror M and reflected by the plane mirror M. The measuring light $P_2$ reflected by the plane mirror M is made into a S-polarization mode again by the quarter-wave plate 132. The S-polarization mode measuring light $P_2$ is reflected by the reflecting surface 131c and made incident to a polarized beam splitter 333. This polarized beam splitter 333 comprises two prisms 333a and 333b, and 333c denotes a reflecting surface thereon. The S-polarization mode measuring light $P_2$ reflected by the polarized beam splitter 333 becomes a circularly polarized light, advances toward the plane mirror M and is reflected by the plane mirror M again.

The circularly polarized measuring light $P_2$ reflected by the plane mirror M passes through a quarter-wave plate 335 again, becomes a P-polarization mode and is made incident to the polarized beam splitter 333. The measuring light $P_2$, made incident to the polarized beam splitter 333 passes the reflecting surface 333c, because it is a P-polarization mode and is made incident to the rod lens 134. Since the measuring light $P_2$ is reflected by the plane mirror M twice in this embodiment, any adverse affection of the flaming of the plane mirror M can be avoided.

What is claimed is:

1. A range finder for finding a distance to an object comprising an outgoing light path for guiding a beam of light emitted from a light source to said object, a reference light path for guiding a part of a beam of light propagating through said outgoing light path to outside said outgoing light path, and an incoming light guiding wave path adapted to allow a reflecting beam of light reflected by said object and a beam of light guided by said reference light path to be interfered with each other and to guide the interference light to a light receiving element, said finder further comprising wavelength changing means for changing the wavelength of said beam of light emitted from said light source;

wavelength detecting means for detecting the wavelength of said beam of light emitted from said light source;

calculating means for detecting at least two peaks of the signal coming from the light receiving element when the wavelength of the light source is changed by said wavelength changing means, finding the wavelengths of the light source respectively, from said wavelength detecting means at the time when the signal exhibits the two peaks and calculating the distance to the object according to an operation expression memorized beforehand with reference to such obtained two wavelengths;

a polarized beam splitter disposed on an optical path of a beam of light emitted from said outgoing light path for guiding a beam of light to said object;

a quarter-wave plate disposed on an optical path between said polarized beam splitter and said object;

a total reflection prism for guiding said reflecting beam of light reflected by said object to said incident light path; and a half-wave plate disposed on an optical path between said total reflection prism and said incident light path.

2. A distance measuring device according to claim 1, wherein said outgoing light path comprises an outgoing light guiding wave path, said reference light path comprises a reference light guiding wave path, and said incoming light path comprises a reference incoming light guiding wave path.

3. In a range finder for finding a distance to an object comprising an outgoing light guiding wave path for guiding a beam of light emitted from a light source to the object, a reference light guiding wave path for guiding a part of a beam of light propagating through the light guiding wave path to outside the outgoing light guiding wave path, and an incoming light guiding wave path adapted to allow the reflecting beam of light reflected by the object, and a beam of light guided by the reference light guiding wave path to be interfered with each other and to guide the interference light to a light receiving element, said finder further comprising wavelength changing means for changing the wavelength of the beam of light emitted from the light source;

wavelength detecting means for detecting the wavelength of the beam of light emitted from the light source;

calculating means for detecting at least two peaks of the signal coming from the light receiving element when the wavelength of the light source is changed by said wavelength changing means, finding the wavelengths of the light source, respectively, from said wavelength detecting means at the time when the signal exhibits the two peaks, and calculating the distance to the object according to an operation expression memorized beforehand with reference to each obtained two wavelengths;

a polarizing beam splitter disposed on an optical path of the beam of light radiated from the outgoing light guiding wave path;

a quarter-wave plate disposed on an optical path between said polarizing beam splitter and the object; and a mode converting device for converting the mode of the reflecting beam of light guided to the incident light guiding wave path to the same mode of the beam of light propagating through the outgoing light guiding wave path;

said polarizing beam splitter projecting the beam of light coming from the outgoing light guiding wave path to the object through the quarter-wave plate and guiding the beam of light reflected by the object and made incident thereto through the quarter-wave plate to the incident light guiding wave path.

4. A range finder according to claim 3 further including a total reflection prism adapted to guide a reflecting beam of light reflected by said polarized beam splitter to the incident light guiding path.

5. A range finder for finding a distance to an object comprising an outgoing light guiding wave path for guiding a beam of light emitted from a light source to said object, a reference light guiding wave path for guiding a part of a beam of light propagating through said outgoing light guiding wave path to outside said outgoing light guiding wave path, and an incoming light guiding wave path adapted to allow a reflecting beam of light reflected by said object and a beam of light guided by said reference light guiding wave path to be interfered with each other and to guide the interference light to a light receiving element, said finder further including;

wavelength changing means for changing the wavelength of said beam of light emitted from said light source;

wavelength detecting means for detecting the wavelength of said beam of light emitted from said light source;

calculating means for detecting at least two peaks of the signal coming from the light receiving element when the wavelength of the light source is changed by said wavelength changing means, finding the wavelengths of the light source, respectively, from said wavelength detecting means at the time when the signal exhibits the two peaks, and calculating the distance to the object according to an operation expression with reference to said obtained two wavelengths;

a total reflection prism disposed on an optical path of a beam of light emitted from said outgoing light guiding wave path;

a polarized beam splitter for guiding a beam of light reflected from said total reflection prism to said object and guiding said reflecting beam of light reflected by said object to said incident light guiding wave path;

a quarter-wave plate disposed on an optical path between said polarized beam splitter and said object; and a mode converting device for converting the mode of the reflecting beam of light guided to the incident light guiding wave path to the same mode as the beam of light propagating through said outgoing light guiding wave path.

6. A range finder according to any one of claim 3 through claim 5, wherein said mode converting device comprises a quarter-wave plate.

7. A range finder according to any one of claim 3 through 5, wherein said mode converting device is disposed on the incident light guiding wave path.

* * * * *